E. C. SEMPLE.
LOCK NUT.
APPLICATION FILED MAR. 3, 1919.
1,309,817.
Patented July 15, 1919.
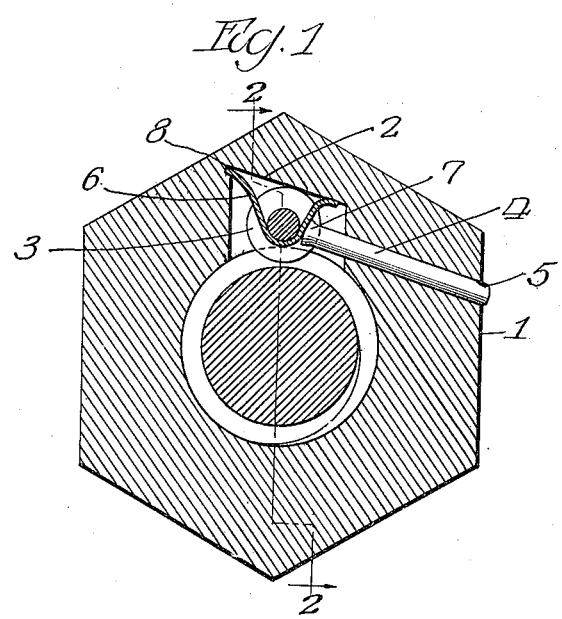
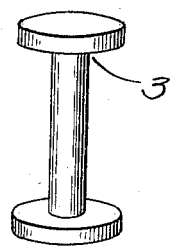
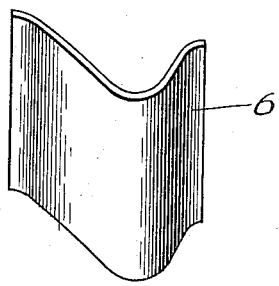
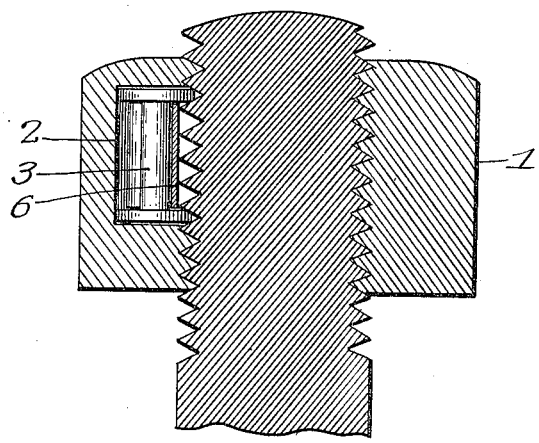
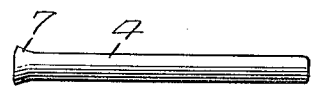
Witness:
H. S. Barrett
Inventor
Edwin C. Semple

UNITED STATES PATENT OFFICE.

EDWIN C. SEMPLE, OF CHICAGO, ILLINOIS.

LOCK-NUT.

1,309,817.

Specification of Letters Patent.   Patented July 15, 1919.

Application filed March 3, 1919.   Serial No. 280,442.

*To all whom it may concern:*

Be it known that I, EDWIN C. SEMPLE, a citizen of the United States, residing at Chicago, in the county of Cook and State of Illinois, have invented new and useful Improvements in Lock-Nuts, of which the following is a specification.

My invention relates to improvements in lock-nuts in which a loosely seated roller operates in conjunction with a cut-out portion or recess in one side of the nut; and the objects of my invention are: first, to provide a positive means of locking the nut from backward turning caused by vibration; second, to provide means for normally retaining said roller and cut-out portion or recess in proper locking relation; third, to provide a lock-nut with means for releasing the nut, at will, from locking engagement with the threads of a bolt to which it is applied, to permit the removal of the nut from the bolt for purposes of repair, without damage to the threads of the bolt, in order that the same lock-nut may be again used after any repair work has been completed.

This invention relates to improvements in lock nuts in which a portion of the inner threaded surface of the nut is cut away, and in which a roller is loosely carried, which roller co-acts with the outer wall of the cut-out in the nut, to lock the nut from backward turning, but automatically rolls out of locking position when the nut is wrenched forward, and in which a plunger is arranged at one side of the nut and extends through an opening into said cut-out portion of the nut to force the roller out of portion of locking relation with the threads of the bolt. The cut-out portion is preferably nearer the outer than the inner end of the nut, so that the greatest strength of the nut will be a its inner end where it grips upon another part. The purpose of this construction is to avoid the use of a holding nut and a grip nut.

I also employ a flat spring, whose purpose is to retain the locking roller and releasing plunger from dropping out of position when the nut is removed from the bolt, and also to hold the roller from dropping by force of gravity into the left-hand side of the cut-out in the nut when the nut is turned so that the action of gravity comes into play, and said spring also acts at the same time to normally press the releasing plunger outwardly but is sufficiently resilient to permit of being bent backwardly when the jaws of a wrench engage the outer end of the releasing plunger. Said spring is preferably of sufficient width to exactly fit in between the two enlarged ends of the locking roller, which tends to stabilize or steady the roller to prevent its binding and permit of its working smoothly. The roller and plunger are preferably constructed of steel or other hard metal. In assembling the parts, the locking roller may be placed within the bend of the spring and the two parts inserted in the cut-out together, the releasing plunger having first been inserted through the opening on the side of the nut and its inner end enlarged or upended by being hammered against the back wall of the cut-out, thus forming a slight head on the inner end of the plunger which prevents its becoming dislodged when the nut is in use. The plunger extends only slightly out of the opening in the side of the nut, preferably having its outer end slightly rounded off so as to lessen the liability of said outer end catching in waste or other cleaning material in the hands of workmen.

The object of my invention is to provide a lock nut which may be positively locked at any point on the threads of a bolt, and which may be wrenched forward when desired to take up any slack or looseness caused by wear or rusting of the parts of machinery in connection with which such lock-nut is used.

A further object is to provide a lock nut which may serve the purpose of both a holding-nut and a lock-nut.

A further object is to provide a lock nut which shall have all of its movable parts so housed within the nut that there can be no possibility of their becoming lost out; for instance, when the lock nut is used on a fly-wheel, or any rapidly moving part, or parts running in oil, or where oil from machinery drips on the nut and bolt.

A further object is to provide a lock nut which may be readily and easily unlocked, at will, and wrenched off of the threaded end of a bolt the same as an ordinary nut, and without injury to the threads of the bolt.

I accomplish these objects by means of the construction illustrated in the accompanying drawing, in which—

Figure 1 is a sectional view illustrating the location of the movable parts of a lock nut constructed in accordance with the principles of my invention.

Fig. 2 is a sectional elevation on the line 2—2 of Fig. 1, showing the locking roller housed within the nut.

Fig. 3 is a detached detail view of the locking roller.

Fig. 4 is a perspective view showing the preferred form of leaf spring employed for normally retaining the locking roller and releasing plunger in position.

Fig. 5 is a detached detail view illustrating the releasing plunger.

Referring to the various figures of the drawing, the nut 1 is provided on its inner threaded surface with a cut-out portion 2, in which is housed a locking roller 3, adapted to normally rest in locking relation with the threads of the bolt. In order to provide means for releasing the locking roller 3 from engagement with the threads of the bolt, I employ a plunger 4, which is adapted to be loosely carried in an opening 5 in the side of the nut 1. I employ a flat spring 6, which is preferably of sufficient width to extend the entire distance between the enlarged ends of the roller 3, which tends to stabilize or steady the roller 3 and permit of its working smoothly within the cut-out portion 2.

The releasing plunger 4 is slightly enlarged at its inner end 7, to prevent its becoming lost out while in use.

The spring 6 is adapted to pass down and under the roller 3, and upwardly in the manner shown in Fig. 1, the left-hand end of said spring 6 normally seated in groove 8 in the wall of the cutout 2, and the opposite end of said spring 6 normally pressing against the inner end 7 of plunger 4, said spring 6 being adapted to be depressed by the plunger 4 when the jaws of a wrench are applied to the nut 1.

The purpose of the spring 6 is to hold the roller 3 from being displaced when the nut is removed for repair purposes, and also to prevent the roller 3 from dropping by gravity into the wider portion of the cut-out 2, which would cause the roller 3 to lose its grip upon the threads of the bolt; while in that position.

In practice I prefer to form the cut-out 2 directly across one corner of the nut, as shown in Fig. 1, the object being to avoid weakening the nut unnecessarily.

What I claim as my invention and desire to secure by Letters Patent is:—

1. A lock nut having a cut-out portion on its inner threaded surface; a locking device housed in said cut-out; a plunger in one side of said nut adapted to disengage said locking device from contact with the threads of the bolt; and a spring for retaining said locking device and said plunger in their normal positions, said spring also operating to retain the said locking device in the cut-out portion.

2. A lock nut having a cut-out portion on the inner threaded surface thereof, said cut-out being formed adjacent the outer end of the nut and extending through only a portion of the length of the nut; a roller loosely mounted in said cut-out; a plunger mounted in one side of the nut and having its inner end slightly enlarged, said plunger adapted to displace said roller from its locking position; a spring for holding said roller and plunger in their normal positions and for maintaining the roller in the cut-out.

3. A lock nut having a recess on the inner threaded surface thereof, said recess being wider on one side than the other; a roller housed in said recess; a plunger loosely mounted in one side of the nut and having its inner end slightly enlarged; and a spring housed in said recess for holding said roller and plunger normally in operating position, said spring also serving to retain the roller seated in the recess.

4. In a lock nut, the combination with a threaded bolt, of a nut having a cut-out portion on its inner threaded surface extending only a portion of the distance through the nut; a locking roller loosely held in said cut-out; a plunger adapted to forcibly engage said locking roller to unlock the same from engagement with the threads of the bolt; and means for holding said locking roller and said plunger in their normal positions, the said means also operating to close the said cut-out portion against the exit of the roller.

5. In a lock nut, the combination with a threaded bolt, of a nut having a recess on its inner threaded surface formed adjacent the outer end of said nut and extending only a portion of the distance through the nut; a loosely held roller housed in said recess; a plunger on one side of the nut projecting into said recess; and a spring for holding said roller and plunger in their normal positions and for maintaining the roller within the recess.

6. In a lock nut, the combination with a threaded bolt, of a nut having a recess on its inner threaded surface formed adjacent the outer end of said nut and extending through only a portion of the thickness of the nut; a loosely held locking roller housed in said recess; a plunger on one side of the nut projecting into said recess; and a spring for holding said locking roller and said plunger in their normal positions and for maintaining the roller within the recess.

7. In a lock nut, the combination with a threaded bolt, of a nut having a recess on its inner threaded surface formed adjacent the outer end of said nut and extending through only a portion of the thickness of the nut; a locking roller held loosely in said recess; a plunger on one side of the nut projecting into said recess and having its inner end slightly enlarged, said plunger adapted to be depressed to force said locking roller out of locking position; and a spring passing under said roller and having its respective ends bearing against the side walls of said recess.

8. A lock nut having a recess formed on the inner threaded surface thereof and having its back wall slanted or tapering; a locking roller loosely held in said recess; a releasing plunger carried by the nut and extending into said recess; and a spring normally acting to press said plunger outwardly and to retard said roller from backward movement by gravity, said spring also operating to maintain the roller seated in the recess.

9. In a lock nut, the combination with a threaded bolt, of a nut having a slanting or tapering recess on its inner threaded surface; a locking member loosely carried in the recess; an unlocking device adapted to disengage the locking member from locking relation with the threads of the bolt; and a spring for retaining the locking member and unlocking device normally in position, said spring also operating to hold the roller against displacement out of the recess.

10. A lock nut embodying a threaded bolt, a nut having an interiorly opening recess adjacent one end, a locking element arranged loosely in said recess and adapted to project therebeyond, means carried by the nut and accessible from the outer face of the nut to render said element inactive, and a yielding element encompassing a portion of the said locking element and operating to maintain the latter in position within the recess.

11. A lock nut embodying a threaded bolt, a nut having an interiorly opening recess, a locking element arranged loosely in said recess and adapted to project therebeyond, an element extending into the recess and projecting beyond the outer face of the nut and adapted to render the locking element inactive, and a yielding element passing under said locking element, the ends of said yielding element contacting with the side walls of the recess.

In testimony whereof I have hereunto set my hand in the presence of two subscribing witnesses.

EDWIN C. SEMPLE.

Witnesses:
  ANTON O. HAGEMAN,
  EINAR MICHAELSON.

Copies of this patent may be obtained for five cents each, by addressing the "Commissioner of Patents, Washington, D. C."